US010528741B1

(12) United States Patent
Collins et al.

(10) Patent No.: US 10,528,741 B1
(45) Date of Patent: Jan. 7, 2020

(54) COMPUTER IMPLEMENTED SYSTEMS AND METHODS FOR ASSESSING OPERATIONAL RISKS AND MITIGATING OPERATIONAL RISKS ASSOCIATED WITH USING A THIRD PARTY SOFTWARE COMPONENT IN A SOFTWARE APPLICATION

(71) Applicant: VCE Company, LLC, Richardson, TX (US)

(72) Inventors: Desmond M Collins, Cork (IE); Yohann Duchenay, Cork (IE); James Flynn, Cork (IE); Aidan Moore, Cork (IE); Cian O'Mahony, Cork (IE)

(73) Assignee: VCE IP Holding Company LLC, Richardson, TX (US)

(*) Notice: Subject to any disclaimer, the term of this patent is extended or adjusted under 35 U.S.C. 154(b) by 429 days.

(21) Appl. No.: 15/209,580

(22) Filed: Jul. 13, 2016

(51) Int. Cl.
*G06F 21/57* (2013.01)
*G06F 8/70* (2018.01)

(52) U.S. Cl.
CPC .......... *G06F 21/577* (2013.01); *G06F 8/70* (2013.01); *G06F 2221/033* (2013.01)

(58) Field of Classification Search
CPC .... G06F 21/577; G06F 8/70; G06F 2221/033; G06F 17/50
USPC .......................................................... 726/25
See application file for complete search history.

(56) References Cited

U.S. PATENT DOCUMENTS

| 7,191,435 | B2* | 3/2007 | Lau ........................... G06F 8/65 714/38.1 |
| 7,363,237 | B1* | 4/2008 | Adams ................... G06Q 50/04 705/1.1 |
| 7,401,331 | B2* | 7/2008 | Leung ....................... G06F 8/20 717/168 |
| 7,500,234 | B2* | 3/2009 | Hatasaki .................. G06F 8/64 717/168 |
| 7,512,595 | B1* | 3/2009 | McBride .......... G06F 17/30286 |
| 7,600,219 | B2* | 10/2009 | Tsantilis .................... G06F 8/71 707/999.202 |
| 7,603,253 | B2* | 10/2009 | Berstis ................. G06Q 10/063 702/179 |
| 7,657,871 | B2* | 2/2010 | Velupillai ........... H04L 41/0681 717/121 |

(Continued)

*Primary Examiner* — Mohammed Waliullah
(74) *Attorney, Agent, or Firm* — Womble Bond Dickinson (US) LLP

(57) ABSTRACT

Methods and systems are disclosed for automatically assessing and mitigating operational risks associated with using a software component in a software application. As a part of a method, one or more software components of the software application is accessed and software component characteristic information is received about each of the one or more software components, responsive to the accessing. The software component characteristic information includes information about a characteristic of a software component that is related to an operational risk associated with using the software component in the software application. Responsive to receiving the software component characteristic information, and based on the software component characteristic information, operational risk assessment information is generated using one or more rules. The generated operational risk assessment information is outputted where at least one step of the method is performed by a processor.

12 Claims, 7 Drawing Sheets

(56) References Cited

U.S. PATENT DOCUMENTS

| | | | | |
|---|---|---|---|---|
| 7,688,757 B2* | 3/2010 | Bauer | G06F 8/36 | 370/254 |
| 7,779,402 B2* | 8/2010 | Abernethy | G06F 8/656 | 717/168 |
| 7,814,473 B2* | 10/2010 | Datta | G06F 8/65 | 717/168 |
| 7,857,222 B2* | 12/2010 | Kosecki | G06F 8/65 | 235/462.15 |
| 8,024,209 B2* | 9/2011 | Berstis | G06Q 10/0631 | 705/7.12 |
| 8,161,288 B2* | 4/2012 | Newman | G06F 21/10 | 713/182 |
| 8,185,888 B2* | 5/2012 | Duplessis | G06F 8/60 | 717/121 |
| 8,196,133 B2* | 6/2012 | Kakumani | G06F 9/4416 | 717/172 |
| 8,280,030 B2* | 10/2012 | Bushey | H04M 3/5166 | 379/142.05 |
| 8,332,816 B2* | 12/2012 | Stienhans | G06F 8/71 | 717/120 |
| 8,352,914 B2* | 1/2013 | Sarkar | G06Q 99/00 | 717/102 |
| 8,359,571 B2* | 1/2013 | Clemm | G06F 8/71 | 717/120 |
| 8,370,471 B2* | 2/2013 | Madej | H04L 41/0226 | 709/223 |
| 8,402,452 B2* | 3/2013 | Baratti | G06F 8/65 | 717/169 |
| 8,423,963 B2* | 4/2013 | Garbers | G06F 9/44536 | 717/124 |
| 8,429,610 B2* | 4/2013 | Clemm | G06F 8/71 | 717/120 |
| 8,464,244 B2* | 6/2013 | Stern | G06F 9/44505 | 717/172 |
| 8,516,446 B2* | 8/2013 | Williams | G06F 9/44589 | 717/124 |
| 8,516,594 B2* | 8/2013 | Bennett | G06F 21/577 | 713/188 |
| 8,522,083 B1* | 8/2013 | Cohen | G06F 11/3672 | 714/38.1 |
| 8,539,123 B2* | 9/2013 | Caballero | G06F 13/102 | 710/15 |
| 8,621,123 B2* | 12/2013 | Caballero | G06F 3/00 | 710/62 |
| 8,635,609 B2* | 1/2014 | Deblaquiere | G06F 21/57 | 717/173 |
| 8,713,525 B2* | 4/2014 | Attalla | G06F 8/65 | 705/26.35 |
| 8,719,073 B1* | 5/2014 | Kirshenbaum | G06Q 30/0201 | 705/7.14 |
| 8,726,272 B2* | 5/2014 | Williams | G06F 8/65 | 717/173 |
| 8,732,689 B2* | 5/2014 | Sims | G06F 8/65 | 715/771 |
| 8,745,611 B2* | 6/2014 | Saraf | G06F 8/65 | 717/170 |
| 8,751,232 B2* | 6/2014 | Bushey | G10L 15/063 | 704/244 |
| 8,824,659 B2* | 9/2014 | Bushey | G10L 19/0204 | 379/265.02 |
| 8,832,840 B2* | 9/2014 | Zhu | G06F 21/577 | 713/152 |
| 8,893,106 B2* | 11/2014 | Ningombam | G06F 8/65 | 717/170 |
| 8,949,814 B2* | 2/2015 | Green | G06Q 10/04 | 717/168 |
| 8,996,916 B2* | 3/2015 | Huang | G06F 11/0748 | 714/27 |
| 9,069,904 B1* | 6/2015 | Cohen | G06F 11/3688 | |
| 9,092,579 B1* | 7/2015 | Cohen | G06F 8/30 | |
| 9,112,972 B2* | 8/2015 | Bushey | H04M 3/5166 | |
| 9,134,961 B1* | 9/2015 | Cohen | G06F 8/30 | |
| 9,170,809 B1* | 10/2015 | Cohen | G06F 11/3672 | |
| 9,170,925 B1* | 10/2015 | Cohen | G06F 11/3684 | |
| 9,201,772 B1* | 12/2015 | Cohen | G06F 11/3684 | |
| 9,201,773 B1* | 12/2015 | Cohen | G06F 11/3684 | |
| 9,201,774 B1* | 12/2015 | Cohen | G06F 11/3684 | |
| 9,275,518 B2* | 3/2016 | Gura | G07F 17/32 | |
| 9,317,404 B1* | 4/2016 | Cohen | G06F 11/3684 | |
| 9,317,695 B2* | 4/2016 | Pappas | G06F 21/577 | |
| 9,348,585 B2* | 5/2016 | Eliaš | G06F 8/71 | |
| 9,348,735 B1* | 5/2016 | Cohen | G06F 11/3684 | |
| 9,349,004 B2* | 5/2016 | Bank | G06F 21/56 | |
| 9,497,092 B2* | 11/2016 | Gomez | H04W 64/00 | |
| 9,552,214 B2 | 1/2017 | Stern | | |
| 9,585,033 B2* | 2/2017 | Ding | H04W 24/00 | |
| 9,619,779 B2* | 4/2017 | Fosback | G06Q 10/10 | |
| 9,703,671 B1* | 7/2017 | Cohen | G06F 11/3672 | |
| 9,760,349 B1* | 9/2017 | Chen | G06F 8/433 | |
| 9,787,708 B2* | 10/2017 | Koide | H04L 63/10 | |
| 9,824,223 B2* | 11/2017 | Pappas | G06F 21/577 | |
| 9,880,832 B2* | 1/2018 | Plate | G06F 8/658 | |
| 9,886,262 B2* | 2/2018 | Thomas | G06F 8/61 | |
| 9,934,134 B2* | 4/2018 | Cohen | G06F 9/44589 | |
| 10,042,626 B2* | 8/2018 | Nekrestyanov | G06F 8/65 | |
| 2005/0060213 A1* | 3/2005 | Lavu | G06Q 10/0635 | 705/1.1 |
| 2007/0106599 A1* | 5/2007 | Hochberg | G06Q 10/06 | 705/38 |
| 2007/0239495 A1* | 10/2007 | Osborn | G06Q 10/00 | 705/7.28 |
| 2010/0095277 A1* | 4/2010 | Cheng | G06F 8/71 | 717/127 |
| 2013/0179215 A1* | 7/2013 | Foster | G06Q 10/00 | 705/7.28 |
| 2013/0227683 A1* | 8/2013 | Bettini | G06F 21/57 | 726/22 |
| 2014/0214610 A1* | 7/2014 | Moshir | G06Q 20/4016 | 705/26.35 |
| 2014/0259173 A1* | 9/2014 | Parcel | G06F 21/577 | 726/25 |
| 2014/0324519 A1* | 10/2014 | Dennis | G06Q 10/0635 | 705/7.28 |
| 2014/0331281 A1* | 11/2014 | Bettini | H04L 63/0245 | 726/1 |
| 2015/0332184 A1* | 11/2015 | Osborn | G06Q 10/00 | 705/7.28 |

* cited by examiner

COMPUTER IMPLEMENTED SYSTEMS AND METHODS FOR ASSESSING OPERATIONAL RISKS AND MITIGATING OPERATIONAL RISKS ASSOCIATED WITH USING A THIRD PARTY SOFTWARE COMPONENT IN A SOFTWARE APPLICATION

FIELD OF THE DISCLOSURE

Aspects of the disclosure relate to a computer implemented system, and method, for assessing operational risks and mitigating operational risks associated with using a third party software component in a software application.

BACKGROUND

Conventional software development systems require a lot of manual effort from Developers who collaborate on software projects. A Scrum team is a team of Developers that collaborate on complex software projects. Whenever a third party library is added to a software project a spreadsheet is updated by the Scrum team. This process places the responsibility of updating the spreadsheet on each Developer. This task may be forgotten or neglected when a Developer is faced with a pressurized deadline. As such, there is no guarantee that unapproved third party software versions are used or have made their way into the software product without some manual form of validation. Manual validation of third party software is extremely time consuming. As such, security vulnerabilities within older versions of plugins, or newer ones, may not be identified.

In a conventional approach, a Build Engineer or equivalent, reviews the entire code-base after a build, gathers the artifacts, and painstakingly, manually and visually, examines each artifact and compares them to the spreadsheet. This can take a number of days or weeks to complete. And, mistakes can easily be made that can expose the Developer to litigation. To find vulnerabilities or legacy plugins or deprecated plugins, one or more individuals would have to analyze the old plugins manually, which may not be possible without support.

SUMMARY

Conventional approaches to validating third party software can require one or more individuals to analyze old plugins manually which may not be possible without support. A method for automatically assessing and mitigating operational risks associated with using a software component in a software application is disclosed that addresses the aforementioned shortcomings of conventional technologies. However, the claimed embodiments are not limited to implementations that address any or all of the aforementioned shortcomings. As a part of the method, one or more software components of the software application is accessed and software component characteristic information is received about each of the one or more software components, responsive to the accessing. The software component characteristic information includes information about a characteristic of a software component that is related to an operational risk associated with using the software component in the software application. Responsive to receiving the software component characteristic information, and based on the software component characteristic information, operational risk assessment information is generated using one or more rules. The generated operational risk assessment information is outputted where at least one step of the method is performed by a processor.

It will be appreciated that the above summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1A:
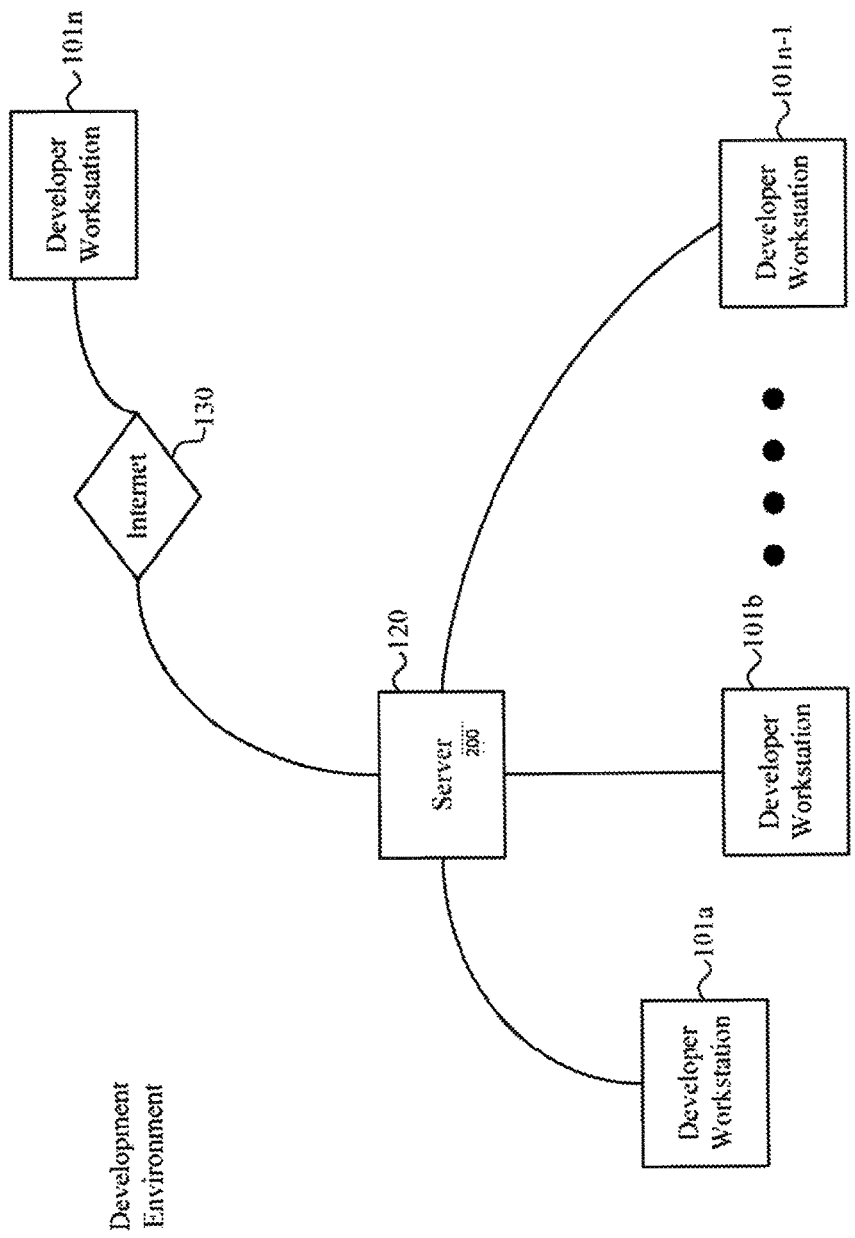

Having thus described the disclosure in general terms, reference will now be made to the accompanying drawings, which are not necessarily drawn to scale, and wherein:

FIG. 1A shows an exemplary software development environment for a system for third party software risk analysis and mitigation according to one embodiment.

Figure 1B:
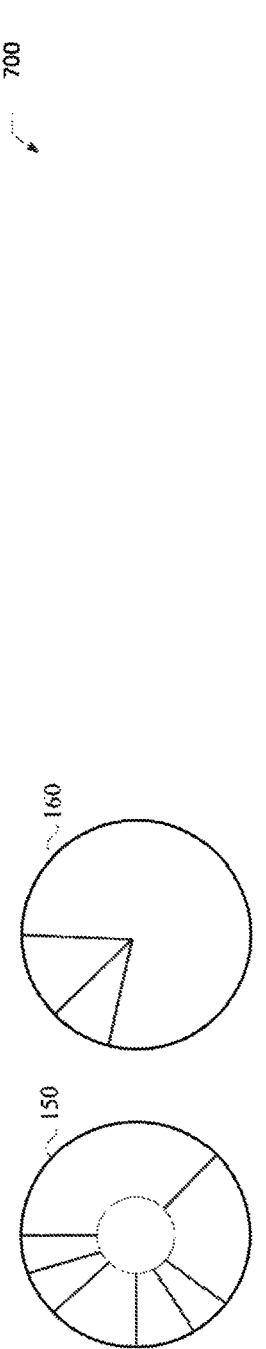

FIG. 1B shows elements of a user interface of a system for third party software risk analysis and mitigation according to one embodiment.

Figure 2A:
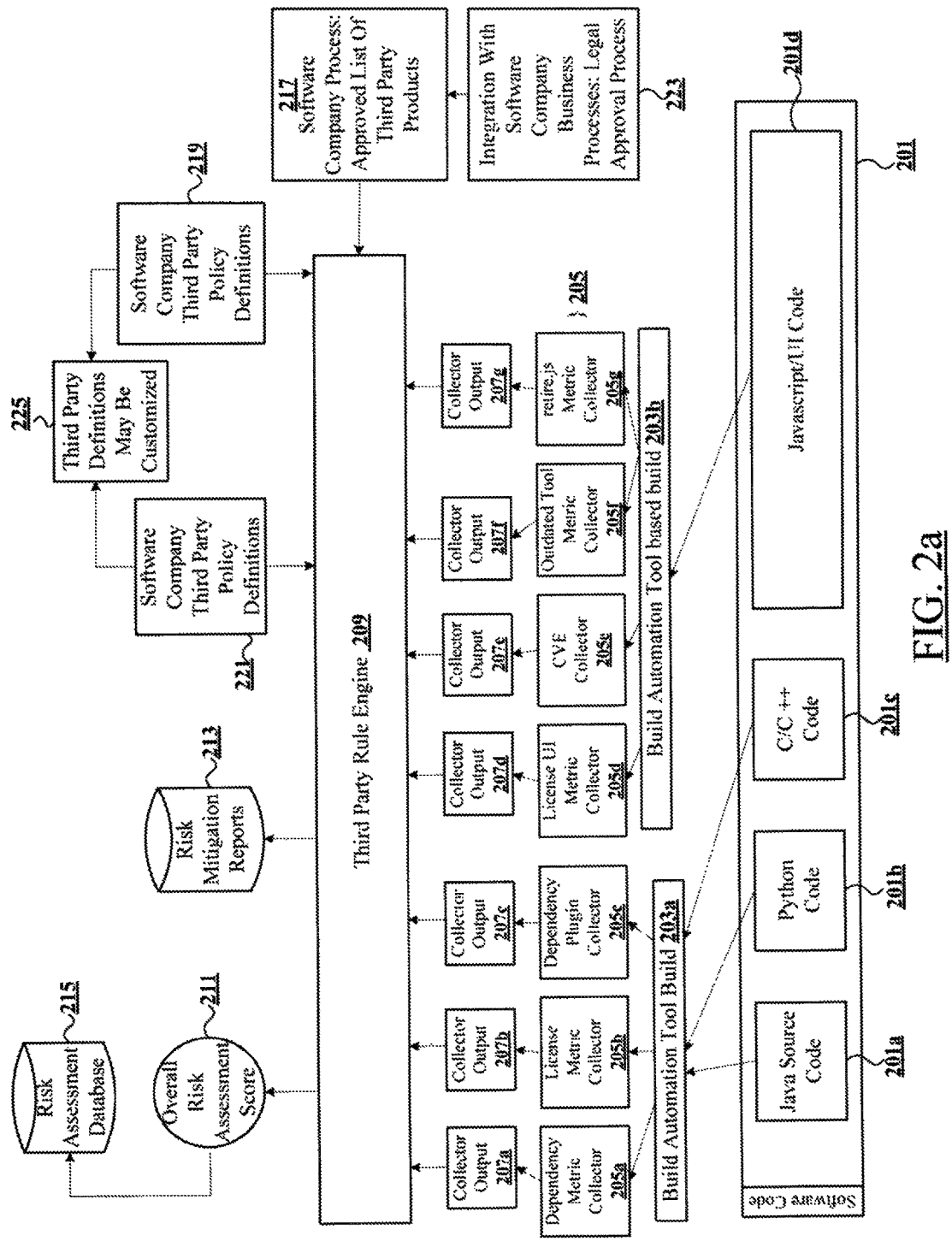

FIG. 2A is a functional block diagram that shows functional blocks and data structures of a system for third party software risk analysis and mitigation according to one embodiment.

Figure 2B:
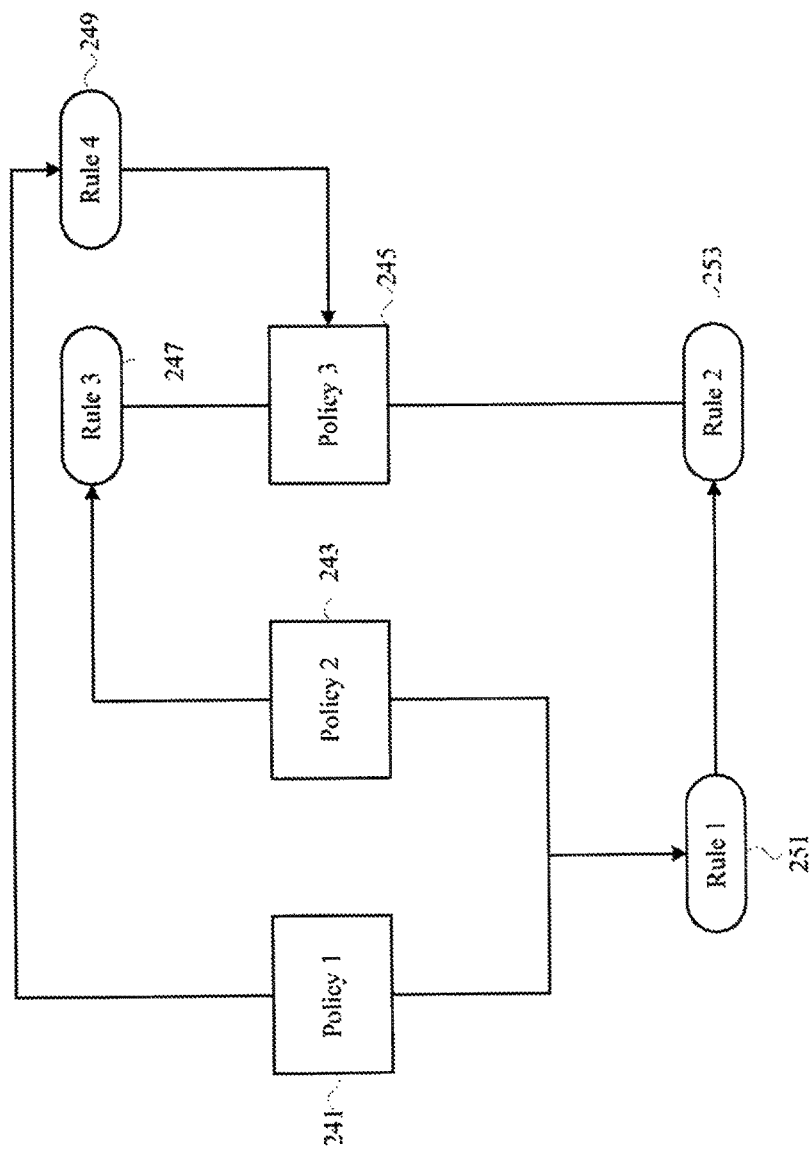

FIG. 2B is a block diagram that illustrates how policies relate to rules that are used by a third party software rules engine according to one embodiment.

Figure 2C:
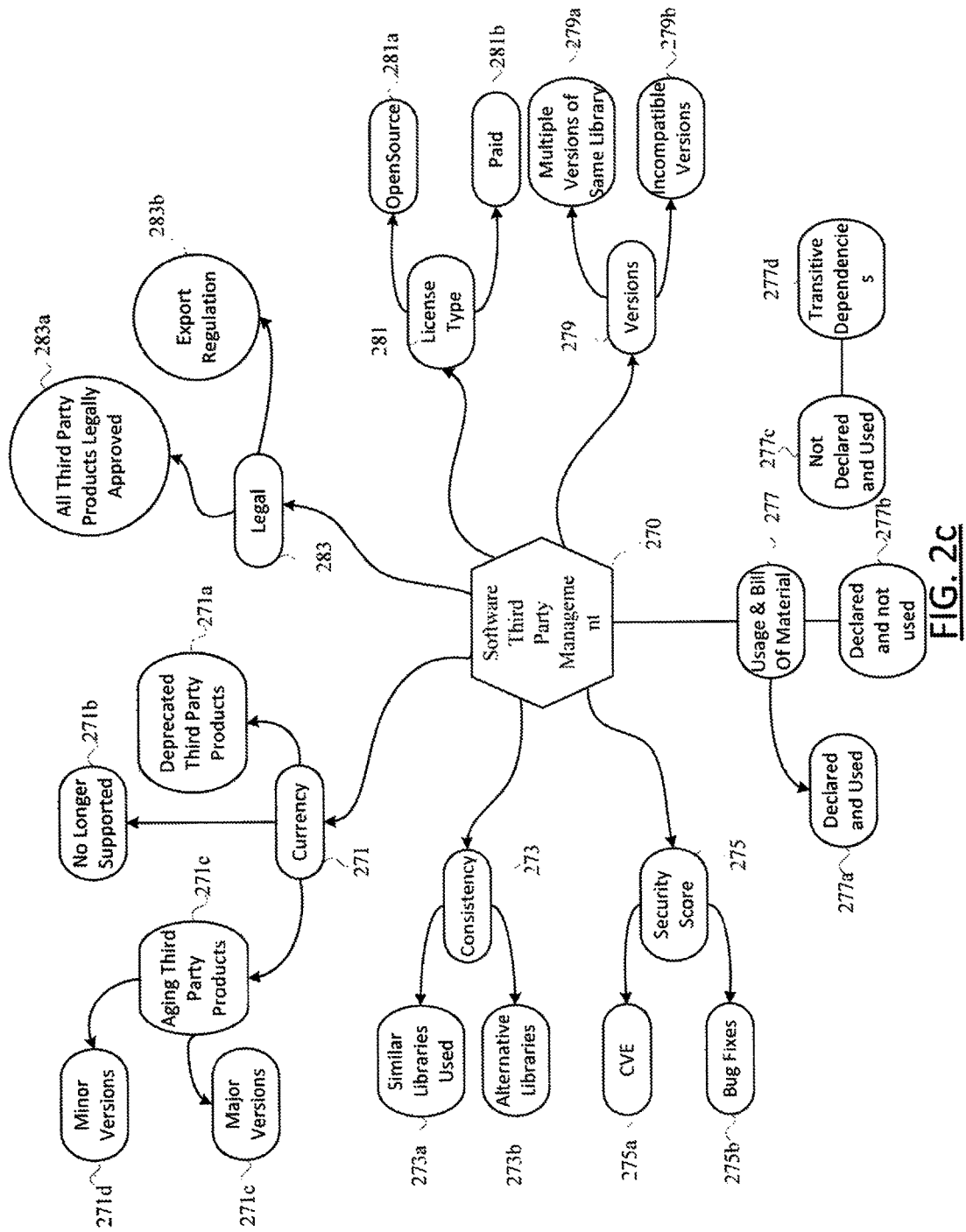

FIG. 2C is a diagram that shows characteristics of third party software that are detected for risk analysis and mitigation according to one embodiment.

Figure 3:
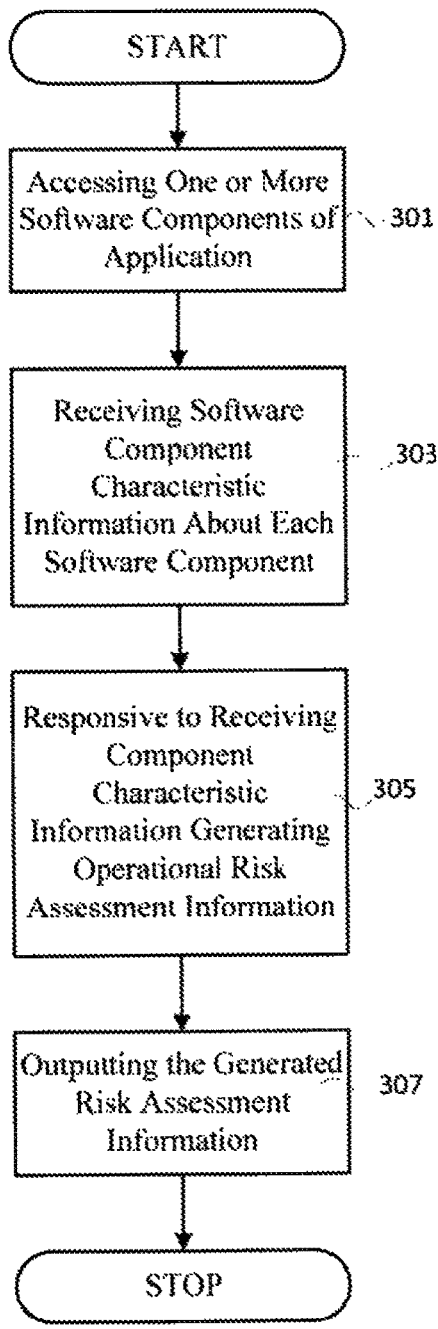

FIG. 3 shows a flowchart of the steps performed in a method for automatically assessing operational risks and mitigating operational risks associated with using a software component in a software application according to one embodiment.

Figure 4:
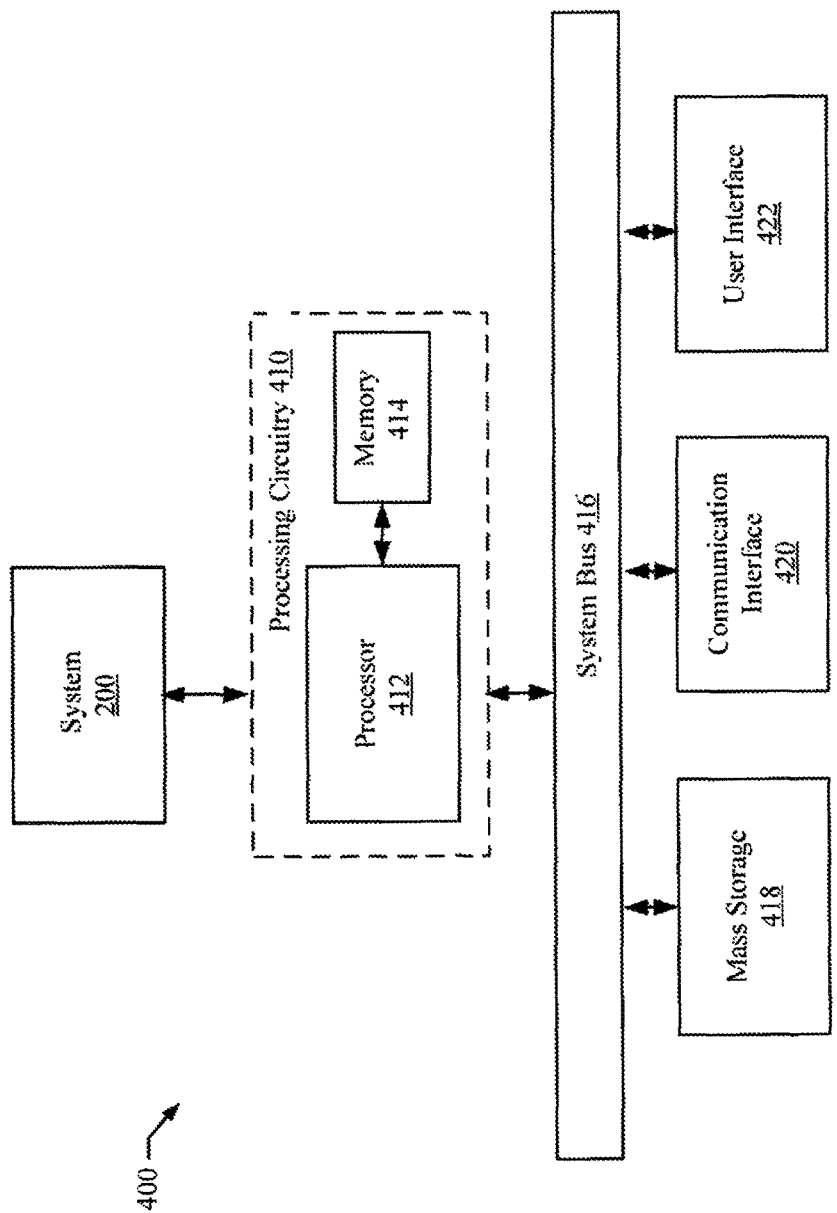

FIG. 4 is a diagram of an example computing system that may be used to implement some example embodiments of a system for third party software risk analysis and mitigation.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "generating" or "outputting" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1A shows an exemplary software development environment for a system 200 for third party software risk analysis and mitigation according to one embodiment. In the FIG. 1A embodiment, the exemplary software development environment includes server 120, internet 130, developer workstations 101*a*-101*n* and system 200.

Referring to FIG. 1A, in one embodiment, system 200 can be a part of, or operate cooperatively with, project management software that executes on central server 120. In such environments, software developer projects can be replicated to a team of project developers working on the project, through central server 120, to developer workstations 101*a*-101*n*, that are located both locally and via the internet 130. In other embodiments, system 200 can be part of a single user system that operates as a desktop application. In one embodiment, when a build is completed, system 200 can access the build and examine the third party software components of the build. Based on the examination, a risk assessment score, and a risk mitigation report, can be generated. In one embodiment, this information can be provided to the developer(s) working on the build to assist in its finalization.

In one embodiment, as a part of the aforementioned risk assessment and risk mitigation functions, system 200 assesses risks related to characteristics of third party software that can include but are not limited to currency, consistency, security score, usage and bill of materials, versions, license type and legal. System 200 uses information related to the aforementioned third party software characteristics to identify and address in an automated manner issues that are not addressed by conventional manual approaches to the examination of third party software. For example, in one embodiment, system 200 determines currency of usage of third party software by comparing the third party software that is being used with published versions of the third party software. In addition, system 200 identifies the third party software that should be given priority for purposes of upgrades. In one embodiment, system 200 identifies the third party software that should be given priority for purposes of upgrades based on information that includes but is not limited to third party policy definitions, consolidated lists of issues for third party software (machine learning) and new third party versions available. Moreover, system 200 determines security issues related to third party software usage by examining plugins and third party policy definitions. In an additional way of addressing issues not addressed by conventional systems, system 200 generates a third party risk analysis score and determines ways to anticipate the degradation of the risk analysis score. In one embodiment, system 200 can generate a third party risk analysis score and determine ways to anticipate the degradation of the risk analysis score based on end of life dates of third party software and deprecation tags of application program interface (API) usage. In a yet additional way of addressing such issues, system 200 identifies third party software that is not used in end products by generating a bill of materials and executing runtime analysis and build time analysis to identify the unused third party software. Furthermore, system 200 provides notice of a change in license of a third party product that is being used based on a detected change in license model between open source versions.

Accordingly, the automated functionality of system 200 eliminates developer responsibility for manually identifying security vulnerabilities by automating the analysis of third party software and the provision of a risk assessment score and a risk mitigation plan.

FIG. 1B shows elements of an exemplary user interface 140 of system 200 (see FIG. 1A) for third party software risk analysis and mitigation according to one embodiment. The interface provides a visual representation of third party components of builds and characteristics of the third party components of builds that can indicate security vulnerability. For example, referring to FIG. 1B, third party software license chart 150 and third party software version chart 160 provides a user with a convenient view of useful third party licensing and version information. In the FIG. 1B embodiment, the individual segments of the charts correspond to third party components of a build. The segments can be configured (e.g., colored, labelled) to provide licensing and version information data, for the corresponding third party components. For example, in the case of licensing, a segment can be configured to indicate whether a third party component is licensed or open source. And, in the case of version information, segments can be configured to indicate whether there are multiple versions of third party software or incompatible versions of third party software. In addition, or alternatively, user interface 140 can include tables with fields where characteristics of third party software that can be used to determine security vulnerability are expressly characterized. For example, referring again to FIG. 1B, a table that includes component name 170, component version 172, latest version 174 and license 176 fields can be included where specified characteristics of first third party software 178 and second third party software 179 are expressly characterized. In addition, in one embodiment, user interface 140 (or a similar user interface) can support the automated risk assessment and mitigation reporting that is done by system 200 (see FIG. 1A), and described in detail herein, by presenting this information in a manner that enables the straightforward access to and use of it by software developers (not shown in FIG. 1B). It should be appreciated that the user interface configuration that is shown in FIG. 1B is only exemplary. Accordingly, in other embodiments, other manners of suitably presenting characteristics of the third party software components of builds that can indicate security vulnerability can be employed.

FIG. 2A is a functional block diagram that shows functional blocks and data structures of system 200 for third party software risk analysis and mitigation according to one embodiment. The functional blocks of system 200 implement an algorithm for third party software risk analysis and mitigation according to one embodiment. In the FIG. 2A embodiment, functional blocks of system 200 include characteristic examination components 205, rule engine 209 and risk assessment database 215 (optional).

Referring to FIG. 2A, software code 201 is used to develop a software application build 203a and/or 203b that can be analyzed by system 200. In one embodiment, the software code that is used in the software application build can include but is not limited to, one or more of, Java source code 201a, Python code 201b, C/C++ code 201c and Javascript/UI code 201d parts. In one embodiment, the software application builds can include but are not limited to maven based builds 203a and npm+bower based builds 203b. In one embodiment, the aforementioned builds are accessed by system 200 and examined to identify third party software components of the builds. In one embodiment, the third party software components are examined to determine the absence or presence of specified characteristics using characteristic examination components 205. In the FIG. 2A embodiment, the software characteristic examination components include dependency examination component 205a, license examination component 205b, dependency plugin examination component 205c, license UI examination component 205d, common vulnerabilities and exposures (CVE) examination component 205e, outdated tool examination component 205f and retire.js examination component 205g. Dependency examination component 205a examines third party software for dependencies, license examination component 205b examines third party software for licenses, dependency plugin examination component 205c examines third party software for dependency plugins, license UI examination component 205d examines third party software for UI licenses, CVE examination component 205e examines third party software for a CVE score, outdated tool examination component 205f examines third party software for outdated components and retire.js 205g examines third party software for known vulnerabilities. However, these software characteristic examination components are only exemplary, as many other characteristics can be examined for risk analysis and mitigation purposes as is discussed in detail herein with reference to FIG. 2C.

Referring again to FIG. 2A, the outputs 207a-207g of third party software characteristic examination components 205 are accessed by a third party rules engine 209. In one embodiment, third party rules engine 209 uses rules in the provision risk assessment scores 211 and risk mitigation plans 213 based on accessed characteristics. In one embodiment, the risk assessment scores can be stored in risk assessment database 215. In one embodiment, the rules that third party rules engine 209 uses are based on lists of approved third party products 217 and third party policy definitions 219, 221, that are compiled by organization staff (e.g., legal, developer) that are tasked with producing this information.

In one embodiment, policies can be set, such as by a policy intern or other staff member via the input of information into a field that can be a part of a user interface associated with system 200. The policies can be accessed by third party rules engine 209 and used to provide overall risk assessment scores 211 and risk mitigation plans 213. For example, consider the case where a field that sets policy regarding the currency of third party software is set using the following or similar entry:

Latest Version–Major=1

In one embodiment, such a setting can be used to indicate that being one major version behind the latest version in production is tolerable but being more than one major version behind the latest version in production (e.g., two behind the latest version) requires a warning. In one embodiment, third party rules engine 209 is able to determine and quantify any difference between the current third party software version and the latest third party software version. Next, consider the case where a field related to the currency of a third party software component of a build is set using the following or similar entry:

Latest Version–Minor=10

In one embodiment, such a setting can be used to indicate that being ten minor versions behind the latest third party software version in production is tolerable but being more than ten major versions behind the latest third party software version in production (e.g., 10 behind the latest version) requires a warning. In one embodiment, third party rules engine 209 can quantify any difference between the current third party software version (e.g., currently used) and the latest third party software version. In one embodiment, policies such as those discussed above, can be the basis for rule formulation. The formulation of rules based on such policies is discussed below with reference to FIG. 2B.

FIG. 2B is a block diagram that illustrates how rules that are used by the third party rules engine of exemplary embodiments, such as third party rules engine 209 in FIG. 2A, are determined. Referring to FIG. 2B, according to one embodiment, a policy 1 241 and a policy 2 243 can be combined to derive a rule 1 251, a policy 1 241 alone can be used to derive a rule 4 249, policy 2 243 alone can be used to derive a rule 3 247 and a policy 3 245 alone can be used to derive a rule 2 253. As shown in FIG. 2B, in some cases where third party software characteristics information that is received by the rules engine causes a rule such as rule 1 251 to be used to determine risk, rule 2 253 can be implicated as an option to appropriately determine risk (e.g., where policies 1, 2 and 3 are involved). A practical illustration of how rules may be formulated from policy definitions is provided below.

The following are exemplary rule formulations based on policy definitions of the form discussed above with reference to FIG. 2A. These type rule formulations are the basis for third party software risk assessments, when particular characteristics of third party software components that are indicated by organization policy to be examined for risk, are detected. For example, in one embodiment, as regards third party software currency, an exemplary formulation of rules can include the following or similar rule formulations: (1) if the version number of a major version of the third party software is less than the latest version number of the third party software and is determined to be two major versions behind the latest version of the third party software then provide a red flag assessment that indicates non-compliance with own policy metric, (2) if the version number of a major version of the third party software is less than the latest version number of the third party software and is determined to be one major version behind the latest version of the third party software then provide a yellow flag assessment that indicates an early action identifier, (3) if the version number of a minor version of the third party software is less than the latest version number of the third party software and is determined to be eight major versions behind the latest version of the third party software then provide a yellow flag assessment that indicates an early action identifier, (4) if the version number of a minor version of the third party software is less than the latest version number of the third party software and is determined to be ten major versions behind the latest version of the third party software then a yellow flag assessment is provided that indicates non-compliance with own policy metric, and (5) for a current version number of the third party software, if the security score is greater than 7.5 (a known CVE risk threshold) and the version number of the third party software is equal to the latest version number of the third party software, an early action identifier is issued. As shown by these exemplary rules, in one embodiment, rules can be formulated and derived directly from policy definition premises.

It should be appreciated that the aforementioned rule formulations are only intended to be exemplary, and are presented to demonstrate how rules related to third party software currency can be formulated based on relevant underlying policies. However, in one embodiment, policies are defined, and rules formulated, for each of the herein described third party software characteristics that are examined.

In one embodiment, when the above described analysis of the third party software components of a build has been completed, and a report has been made available that identifies third party software components that are not compliant with company policies, a mitigation metric, e.g., early action identifier, update warning, which enables third party rule engine 209 to provide better input, can be generated. For example, again using the third party software currency characteristics context, in one embodiment, for the current version number, if the third party software security score is greater than a predetermined threshold number, e.g., 7.5 (a known CVE risk threshold) and if the current third party software version number and the latest third party software version number are equal, an early action identifier can be generated. Moreover, in one embodiment, for the current version number, if the third party software security score is greater than a predetermined threshold number (e.g., 7.5), and if the current third party software version number is less than the latest third party software version number and the latest version has its security vulnerability resolved, a warning that an update is required (e.g., mitigation provided) can be generated. In addition, in one embodiment, for the current version number, if the security score is greater than a predetermined threshold number (e.g., 7.5) and if the current version number is less than the latest version number and the security vulnerability is not resolved in the latest version, an early warning notification that the risk still exists can be generated (no mitigation plan provided). In one embodiment, this risk mitigation information can be provided to the developer(s) as a part of the provision of real time warnings and mitigation plans.

Using the methodology described above, exemplary embodiments address many of the problems that are encountered using conventional approaches. For example, exemplary embodiments enable software developers to determine the currency of their usage of third party software. In one embodiment, system 200 accomplishes this by comparing current third party software usage (the versions of third party software currently being used) to published versions of the software. In addition, exemplary embodiments enable software developers to determine the third party software that they should prioritize for upgrade in their next fix pack. For example, system 200 provides complex recommendations based on elements that include but are not limited to third party policy definitions, consolidated list of issues for third party software (machine learning) and new third party versions that are available. As well, exemplary embodiments enable software developers to determine any security issues tied to their usage of third party software. In one embodiment, system 200 can use CVE plugins and third party policy definitions to determine the security issues that are tied to usage of third party software. Likewise, exemplary embodiments enable software developers to determine an overall third party threat/risk analysis score and to anticipate when the score will degrade. In one embodiment, in order to determine the overall third party threat/risk analysis score and to anticipate when the score will degrade, system 200 uses end of life dates of third party software and deprecation tags of API usage. Furthermore, exemplary embodiments enable software developers to determine whether to ship third party software with a product when the third party software is not used in the end product. In one embodiment, system 200 can employ the generation of a Bill of Materials, runtime analysis and build time analysis to identify unused third party software. Also, exemplary embodiments enable software developers to be notified if a license of third party software changes. In one embodiment, system 200 can provide notification of the change in the license of third party software if a license model change is detected between versions of open source.

FIG. 2C shows the relationship between third party software management, software characteristics examination components and third party software characteristics according to one embodiment. In one embodiment, third party software management utilizes third party software characteristic examination components (e.g., 205 in FIG. 2A) to detect third party software characteristics. Referring to FIG. 2C, characteristics examination components can include but are not limited to currency examination component 271, consistency examination component 273, security score examination component 275, usage and bill of material examination component 277, versions examination component 279, license type examination component 281 and legal examination component 281. In one embodiment, currency examination component 271, security score examination component 275 versions examination component 279 and license type examination component 281 obtain third party software characteristics information from an examination of the software build.

Referring to FIG. 2C, currency examination component 271 determines the currency of third party software elements of a software build. Characteristics that are detected by currency examination component 271 include but are not limited to whether the third party software is deprecated 271a, whether the third party software is no longer supported 271b and whether the third party software is aging 271c. The characteristics of aging third party software that are detected can include but are not limited to whether the aging third party software is a minor version 271d or a major version 271e.

Consistency examination component 273 determines if third party software that is used in a build is consistent. Characteristics that are identified by consistency examination component 273 can include but are not limited to whether similar libraries are used 273a and whether alternative libraries are used 273b (or should be used).

Security score examination component 275 determines if third party software has a published security score 275a, e.g., a common vulnerabilities and exposures (CVE) score. From the CVE 275a, bug fixes 275b can be determined using an internal database. Moreover, from the CVE 275a, major fixes in the examined third party software can be identified.

Usage and bill of material examination component 277 determines third party software usage and bill of materials. In particular, it determines if third party software is one of, declared and used 277a, declared and not used 277b and not declared and used 277c. In addition, in one embodiment, usage and bill of material examination component 277 also determines transitive dependencies.

Version examination component 279 identifies the third party software versions that are a part of a build and determines whether there are multiple versions of the same software 279a or incompatible versions of software 279b in a build.

License type examination component 281 determines the type of license that third party software has. In one embodiment, license type examination component 281 determines if a license is open source 281a or paid 281b. Legal examination component 283 determines if third party software has been legally approved 283a and export regulation 283b.

Third party software management 270 is the automated management of third party software by developers and includes parts of system 200 such as third party rules engine 209 and threat assessment database 215 and is based on the information that is provided by the third party characteristics examination components and information that may be customized such as company third party policy definitions (see FIG. 2A, 219, 221 and 225).

FIG. 3 shows a flowchart 300 of the steps performed in a method 300 for automatically assessing operational risks and mitigating operational risks associated with using a software component in a software application according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

At 301, one or more software components of a software application are accessed. In one embodiment, from the accessed one or more software components, software component characteristic information is generated. In one embodiment, the software components can be third party software components. In one embodiment, the software components can be third party software components of a build that is prepared by a software developer(s).

At 303, responsive to accessing the one or more software components, receiving software component characteristic information about each of the one or more software components. In one embodiment, the software component characteristic information includes information about a characteristic of a software component that is related to an operational risk associated with using the software component in the software application. In one embodiment, the software component characteristic information can be determined by software component characteristic detection components. In one embodiment, as described herein, software component characteristic information can be accessed by a third party rules engine that determines operational risks based on the characteristics.

At 305, responsive to receiving the software component characteristic information, generating operational risk assessment information using one or more rules and based on the software component characteristic information. In one embodiment, operational risk assessment information can be generated by a rules engine. In one embodiment, the rules engine can generate the operational risk assessment information based at least in part on rules derived from policy definitions provided by a software developer organization.

At 307, the generated operational risk assessment information is output, wherein at least one step of the method is performed by a processor. In one embodiment, the operational risk assessment information can be stored in a database in order to benefit subsequent operational risk assessments. In addition, operational risk mitigation information is generated based on the automatically generated operational risk assessment information.

In one embodiment, third party software policy definition information can be accessed, where the third party software policy definition information includes information defining one or more policies for operating a third party software component. Moreover, approved software component information is accessed, where the approved software component information is information identifying third party software components that are approved for use in the software application. In one embodiment, the aforementioned rules are determined at least in part responsive to accessing the third party software policy definition information and approved software component information. The risk assessment information using one or more of the determined rules.

In one embodiment, software characteristic information comprises software currency information, software consistency information, software security information, software license type information and software version information. In one embodiment, the threat assessment information includes information indicating when an operational risk will increase or decrease. In one embodiment, the risk mitigation information comprises information that prioritizes third party products for upgrade.

Software companies rely on open source and paid third party software to: accelerate software development cycles, reduce software maintenance cost, stay on top of the latest technology advancements etc. Some conventional software platforms use hundreds of third party software elements (where an element is third party software for a particular version). Proper management of third party software in this environment represents a challenge with a set of risks. Exemplary embodiments provide a mechanism to: identify risks associated with third party management in a normalized way, provide risk mitigation plans and raise risk awareness proactively to anticipate an issue (end of life of third party products).

FIG. 4 is a diagram of an example computing system 400 that may be used to implement some example embodiments of a resource identification system. The computing system 400 may be implemented on any computing device or plurality of computing devices that may be configured to implement one or more example embodiments. By way of non-limiting example, in some embodiments, the computing system 400 may be implemented on a user terminal and/or a computing platform(s) of a converged infrastructure.

The computing system may include a plurality of elements, such as processing circuitry 410, mass storage 418, communication interface 420, and user interface 422, which may be interfaced via a system bus 416. It will be appreciated that the components, devices or elements illustrated in and described with respect to FIG. 4 below may not be mandatory and thus some may be omitted in certain embodiments. Additionally, the computing system 400 of some embodiments may include further or different components, devices or elements beyond those illustrated in and described with respect to FIG. 4.

Further, while FIG. 4 illustrates an architecture including elements interfaced via the system bus 416, it will be appreciated that in some example embodiments, elements of the computing system 400 may be implemented in a distributed computing environment in which elements may be distributed across a plurality of computing devices, which may be in communication with each other, such as via a network, to provide functionality of the computing system 400. As such, in some example embodiments, elements of the computing system 400 may be communicatively coupled via a network in addition to or in lieu of the system bus 416.

The computing system 400 of some example embodiments may implement an operating system(s), such as MICROSOFT WINDOWS™, UNIX™, LINUX™, IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, or other known operating systems. It should be appreciated; however, that in some embodiments, one or more aspects of the computing system 400 may be implemented on and/or integrated with a virtualized computing system, such as may be provided by a converged infrastructure.

In some example embodiments, the computing system 400 may include processing circuitry 410 that is configurable to perform actions in accordance with one or more example embodiments disclosed herein. In this regard, the processing circuitry 410 may be configured to perform and/or control performance of one or more functionalities of a system for third party software risk analysis and mitigation (e.g., 200 in FIG. 1A), in accordance with various example embodiments. Thus, the processing circuitry 410 may be configured to perform data processing, application execution and/or other processing and management services according to one or more example embodiments.

In some example embodiments, the processing circuitry 410 may include a processor 412 and, in some embodiments, such as that illustrated in FIG. 4, may further include memory 414. The processing circuitry 410 may be in communication with (e.g., via system bus 416) and/or otherwise control mass storage 418, communication interface 420, and/or user interface 422.

The processor 412 may be embodied in a variety of forms. For example, the processor 412 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 412 may comprise a plurality of processors. The plurality of processors may be in operative communication with each other and may be collectively configured to perform one or more functionalities to support determination of a configuration of a converged infrastructure in accordance with various embodiments. In some embodiments in which the computing system 400 is embodied as a plurality of computing devices, a plurality of processors, which may collectively form the processor 412, may be distributed across a plurality of computing devices that may be in operative communication with each other directly and/or via a network. In some example embodiments, the processor 412 may be configured to execute instructions that may be stored in a memory, such as the memory 414 and/or the mass storage 418 and/or that may be otherwise accessible to the processor 412. As such, whether configured by hardware or by a combination of hardware and software, the processor 412 may be capable of performing operations according to various embodiments while configured accordingly.

In embodiments including the memory 414, the memory 414 may include read only memory (ROM), random access memory (RAM), and/or the like. The mass storage 518 may include one or more memory and/or other storage devices, which may include fixed (e.g., a fixed hard disc drive, storage array, fixed flash memory device, and/or the like) and/or removable memory devices (e.g., a floppy disc drive, a removable flash memory device, an optical disc drive, and/or other removable memory device). The mass storage 418 may provide a persistent data storage device. In some example embodiments, the mass storage 418 may be configured to provide a backup storage. The mass storage 418 may include a memory device implemented locally to the computing system 400 and/or a memory device remote to the computing system 400, which may be communicatively coupled with the computing system 400, such as via a network. In some embodiments in which the computing system 400 is embodied as a plurality of computing devices, the memory 414 and/or mass storage 418 may include a plurality of memory devices, which may be distributed across a plurality of computing devices that may be in operative communication with each other directly and/or via a network to form the computing system 400.

In some embodiments, the memory 414 and/or the mass storage 418 may provide a non-transitory computer-readable storage medium that may store computer program instructions that may be executed by the processor 412. In this regard, the memory 414 and/or mass storage 418 may be configured to store information, data, applications, instructions and/or the like for enabling the computing system 400 to carry out various functions in accordance with one or more example embodiments. Applications that may be executed by the processor 412 may also be in the form of modulated electronic signals that may be accessed via a network modem or other network interface of the computing system 400.

The computing system 400 may further include a communication interface 420. The communication interface 420 may enable the computing system 400 to communicate (e.g., over a network or other communication interface) with another computing device or system. In this regard, the communication interface 420 may include one or more interface mechanisms for enabling communication with other devices and/or networks. As such, the communication interface 420 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 400 may include the user interface 422. It will be appreciated, however, that in some example embodiments, one or more aspects of the user interface 422 may be omitted, and in some embodiments, the user interface 422 may be omitted entirely. The user interface 422 may be in communication with the processing circuitry 410 to receive an indication of a user input and/or to provide an audible, visual, mechanical, or other output to a user. As such, the user interface 422 may include, for example, a keyboard, a mouse, a joystick, a display, a touch screen display, a microphone, a speaker, one or more biometric input devices, and/or other input/output mechanisms.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, mini computers, mainframe computers and the like. Some embodiments may also be practiced in distributed computing environments where tasks are performed by remote processing devices that are linked through one or more networks, such as one or more wireline networks and/or one or more wireless networks.

A computer program product may be used to implement a resource identification system, in some example embodiments. A computer program product embodiment may include a machine-readable, non-transitory (non-volatile) storage medium (media) having instructions stored thereon/in, which can be used to program a computer to perform any of the processes of the embodiments described herein. Computer code for operating and configuring a resource identification system is preferably downloaded and stored on a hard disk, although the entire program code, or portions thereof, may also be stored in any other volatile or non-volatile memory medium or device as is well known, such as a read only memory (ROM) or random access memory (RAM), or provided on any media capable of storing program code, such as any type of rotating or solid state media, or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, virtual private network (VPN), local area network (LAN), etc.) using any communication medium and protocols (e.g. transmission control protocol/internet protocol (TCP/IP), hypertext transport protocol (HTTP), HTTP secure (HTTPS), Ethernet, etc.) as are well known. It may be appreciated that computer code for implementing embodiments of the present invention can be implemented in any programming language that can be executed on a client system and/or server or server system such as, for example, C, C++, hypertext markup language (HTML), any other markup language, Java™, JavaScript, ActiveX, any other scripting language, such as VBScript, and many other programming languages as are well known may be used.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A method for automatically assessing operational risks and mitigating operational risks associated with using a software component in a software application,
comprising:
accessing software components comprising the software application;
responsive to accessing the software components, receiving software component characteristic information about each software component of the software components, including information about a characteristic of the software component that is related to an operational risk associated with using the software component in the software application, wherein the software component characteristic information comprises software currency information, software consistency information, software security information, software license type information and software version information;

determining that a third party software component of the software components is approved for use in the software application based on the software component characteristic information;

generating operational risk assessment information using one or more rules and based on the software component characteristic information;

outputting the operational risk assessment information requiring that the third party software component be upgraded; and generating operational risk mitigation information based on the operational risk assessment information, and including information that prioritizes the third party software component for upgrade over at least another software component of the software components, wherein at least one step of the method is performed by a processor.

2. The method of claim 1, further comprising:

accessing third party software policy definition information, the third party software policy definition information comprising information defining one or more policies for operating the third party software component; and accessing approved software component information, the approved software component information being information identifying third party software components that are approved for use in the software application.

3. The method of claim 2, further comprising determining the one or more rules at least in part responsive to accessing the third party software policy definition information and the approved software component information; and generating the risk assessment information using one or more of the determined rules.

4. The method of claim 1 wherein the operational risk assessment information includes information indicating when an operational risk will increase or decrease.

5. A computer program product for automatically assessing operational risks and mitigating operational risks associated with using a software component in a software application, the computer program product comprising a non-transitory computer-readable storage medium having program instructions stored thereon, which when executed by at least one processor, cause the at least one processor to perform a method comprising:

accessing software components comprising the software application;

responsive to accessing the software components, receiving software component characteristic information about each software component of the software components, including information about a characteristic of the software component that is related to an operational risk associated with using the software component in the software application, wherein the software component characteristic information comprises software currency information, software consistency information, software security information, software license type information and software version information;

determining that a third party software component of the software components is approved for use in the software application based on the software component characteristic information;

generating operational risk assessment information using one or more rules and based on the software component characteristic information;

outputting the operational risk assessment information requiring that the third party software component be upgraded; and generating operational risk mitigation information based on the operational risk assessment information, and including information that prioritizes the third party software component for upgrade over at least another software component of the software components, wherein at least one step of the method is performed by a processor.

6. The computer program product of claim 5, further comprising:

accessing third party software policy definition information, the third party software policy definition information comprising information defining one or more policies for operating the third party software component; and accessing approved software component information, the approved software component information being information identifying third party software components that are approved for use in the software application.

7. The computer program product of claim 6, further comprising determining the one or more rules at least in part responsive to accessing the third party software policy definition information and the approved software component information; and generating the risk assessment information using one or more of the determined rules.

8. The computer program product of claim 5 wherein the operational risk assessment information includes information indicating when an operational risk will increase or decrease.

9. A computer implemented system for automatically assessing operational risks and mitigating operational risks associated with using a software component in a software application, the system comprising:

at least one processor; and at least one memory storing computer program code, wherein the at least one memory and stored computer program code are configured, with the at least one processor, to cause the system to at least:

access software components comprising the software application;

responsive to accessing the software components, receive software component characteristic information about each software component of the software components, including information about a characteristic of the software component that is related to an operational risk associated with using the software component in the software application, wherein the software component characteristic information comprises software currency information, software consistency information, software security information, software license type information and software version information;

determine that a third party software component of the software components is approved for use in the software application based on the software component characteristic information;

generate operational risk assessment information using one or more rules and based on the software component characteristic information;

output the operational risk assessment information requiring that the third party software component be upgraded; and generate operational risk mitigation information based on the operational risk assessment information, and including information that prioritizes the third party software component for upgrade over at least another software component of the software components, wherein at least one step of the method is performed by a processor.

10. The system of claim 9, wherein the system is further caused to:

access third party software policy definition information, the third party software policy definition information comprising information defining one or more policies for operating the third party software component; and access approved software component information, the approved software component information being information identifying third party software components that are approved for use in the software application.

11. The system of claim 10, wherein the system is further caused to determine the one or more rules at least in part responsive to accessing the third party software policy definition information and the approved software component information; and generate the risk assessment information using one or more of the determined rules.

12. The system of claim 9 wherein the operational risk assessment information includes information indicating when an operational risk will increase or decrease.

* * * * *